United States Patent [19]
Arias

[11] Patent Number: 5,966,134
[45] Date of Patent: Oct. 12, 1999

[54] SIMULATING CEL ANIMATION AND SHADING

[75] Inventor: Michael L. Arias, Santa Monica, Calif.

[73] Assignee: Softimage, Montreal, Canada

[21] Appl. No.: 08/671,760

[22] Filed: Jun. 28, 1996

[51] Int. Cl.$^6$ ................................................... G29G 5/02
[52] U.S. Cl. ........................... 345/431; 345/426; 345/441
[58] Field of Search ................................... 345/431, 441, 345/473, 426

[56] References Cited

U.S. PATENT DOCUMENTS

| | | | |
|---|---|---|---|
| 5,583,975 | 12/1996 | Naka et al. | 345/426 |
| 5,621,868 | 4/1997 | Mizutani et al. | 345/431 |
| 5,668,940 | 9/1997 | Steiner et al. | 345/429 |

OTHER PUBLICATIONS

Foley et al.; "Computer Graphics: Principles and Practice"; pp. 132–142, 606, 744–745, 1996.
Carmona, Jeff; "Animation packages let educators explore new dimensions"; The Journal (Technological Horizons in Education) v.22, n. 5, p. 12(4), Dec. 1994.
Martinez, Carlos Domingo; "ElecricImage Animation System 2.0"; Macworld v. 11, n. 12, p. 59 (1), 1994.
Forcade, Tim; "Mimic real–world shadows with color and animation"; Computer Graphics World, v.17, n. 12, p. 59(3), Dec. 1994.

Primary Examiner—Mark K. Zimmerman
Assistant Examiner—Motilewa Good-Johnson
Attorney, Agent, or Firm—Kenneth L. Milik

[57] ABSTRACT

A cel image is rendered by a computer to have a "toon" look that simulates a traditional hand-drawn cartoon cel. The toon appearance of a cel image is characterized by the use of areas selectively colored with a fill, a highlight, or a shadow color. The present invention uses a material shader modified to return a value defining the color applied to each area in the scene being rendered as a function of a predetermined highlight threshold angle, which is compared to the angle of each light ray intersecting surfaces in the image. An edge detection convolution filter is applied to define color lines between the different color areas in the colored image. Contour lines defining the shape of an object and lines on its interior surfaces are determined by applying an edge detection convolution filter to surface normal data for the colored image. Additional smoothstep or gain filters may be applied to improve the contrast of the color lines and contour lines and to thicken the color lines. To avoid aliasing artifacts, the colored image is rendered at from two to four times the resolution of the cel image that is ultimately desired, and the pixels of a composite image produced using the colored image, color lines, and contour lines are averaged down to obtain the desired resolution of the cel image.

30 Claims, 6 Drawing Sheets

TOON_INK OUTPUT SHADER

| LINES BETWEEN COLORS ┌140 | ┌142 |
|---|---|
| CREATE LUMINANCE MAP OF RGBA IN FB1 | FOR EACH PIXEL (X,Y) OF RGBA & FB1, $FB1_{(X,Y)} = R_{(X,Y)} + G_{(X,Y)} + B_{(X,Y)}/3.0$ |
| CREATE EDGE MAP OF FB1 IN FB2 | FOR EACH PIXEL (X,Y) OF FB1 & FB2, $FB1_{(X,Y)}$ = HIGH-PASS FILTER CONVOLUTION OF FB2 CENTERED AT (X,Y) |
| CREATE BLURRED EDGE MAP OF FB2 IN FB1 TO "SPREAD" LINE | FOR EACH PIXEL (X,Y) OF FB2 & FB1, $FB1_{(X,Y)}$ = BLUR FILTER CONVOLUTION OF FB2 CENTERED AT (X,Y) |
| ADJUST LINE QUALITY OF FB1 IMAGE USING "SMOOTHSTEP" FILTER | FOR EACH PIXEL (X,Y) OF FB1, $FB1_{(X,Y)}$ = SMOOTHSTEP $(FB1_{(X,Y)})$ |
| COMPOSITE LINES IN FB1 OVER IMAGE IN RGBA | FOR EACH PIXEL (X,Y) OF FB1 & RGBA, $RGBA_{(X,Y)} = RGBA_{(X,Y)} * FB1_{(X,Y)}$ |
| LINES ON SURFACE CONTOURS ┌144 | ┌146 |
| CREATE EDGE MAP OF NORMAL IN FB1 | FOR EACH PIXEL (X,Y) OF NORMAL & FB1, $FB1_{(X,Y)}$ = HIGH-PASS FILTER CONVOLUTION OF NORMAL CENTERED AT (X,Y) |
| "NORMALIZE" VALUES IN FB1 | FOR EACH PIXEL (X,Y) OF FB1, $FB1_{(X,Y)} = FB1_{(X,Y)}$ /(LARGEST VALUE IN FB1) |
| ADJUST LINE QUALITY OF FB1 IMAGE USING "SMOOTHSTEP" FILTER | FOR EACH PIXEL (X,Y) OF FB1, $FB1_{(X,Y)}$ = SMOOTHSTEP $(FB1_{(X,Y)})$ |
| COMPOSITE LINES IN FB1 OVER IMAGE IN RGBA | FOR EACH PIXEL (X,Y) OF FB1 & RGBA, $RGBA_{(X,Y)} = RGBA_{(X,Y)} * FB1_{(X,Y)}$ |

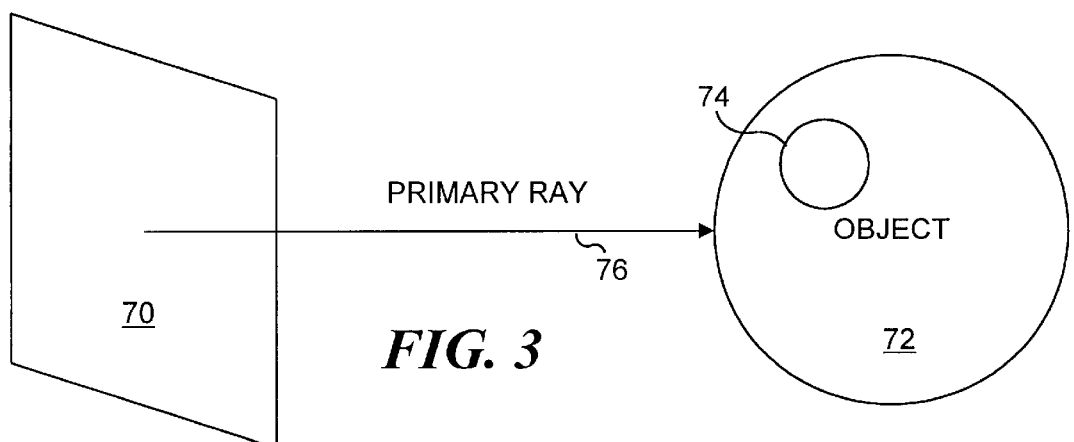
FIG. 3
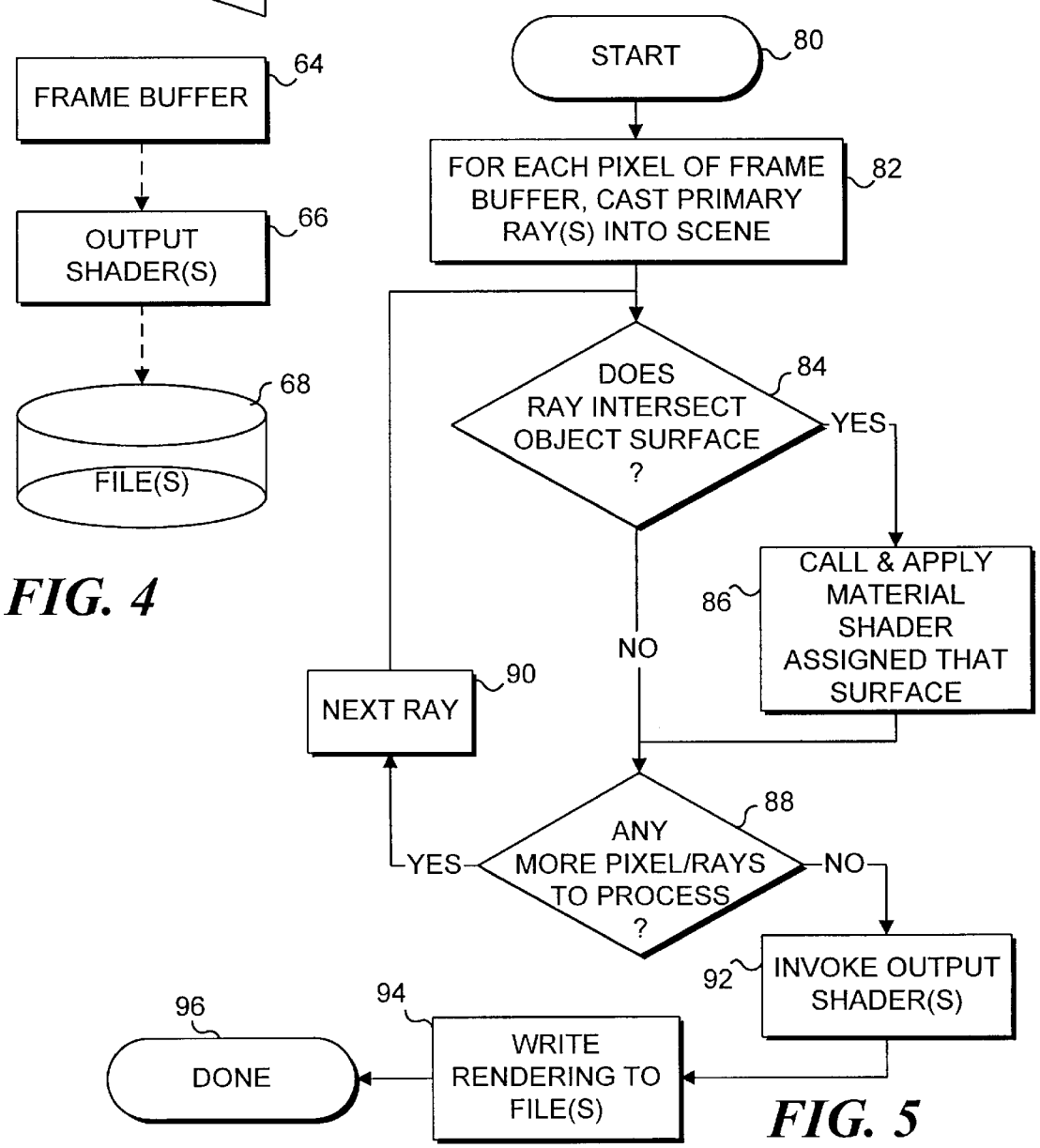
FIG. 4
FIG. 5

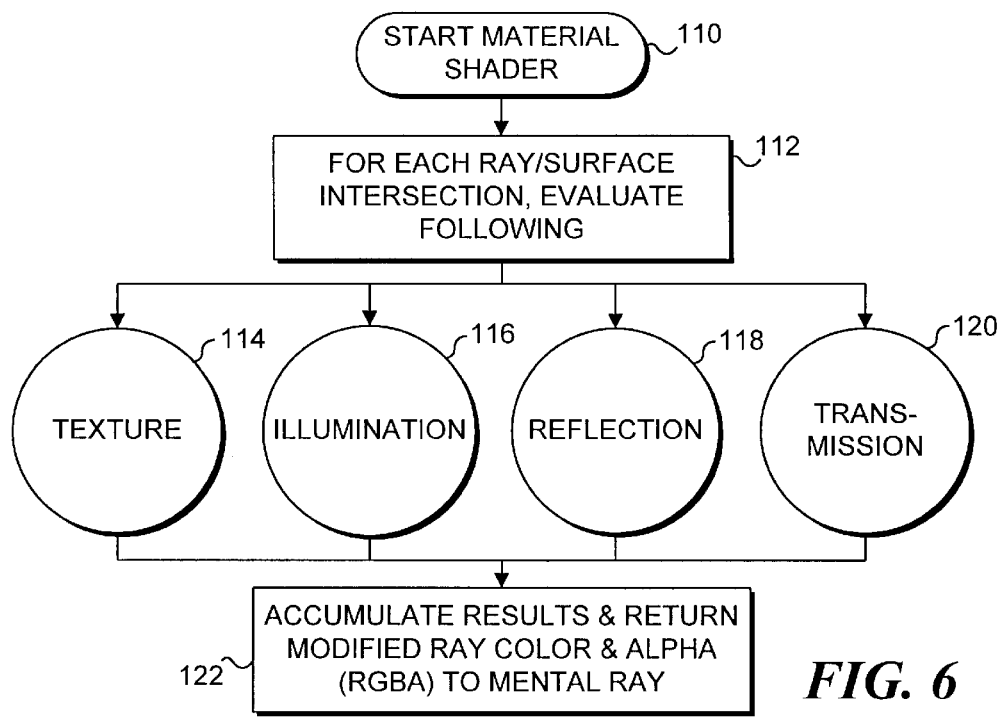

FIG. 6

| PHONG MATERIAL SHADER ILLUMINATION EVALUATION (PRIOR ART) | TOON_PAINT MATERIAL SHADER ILLUMINATION EVALUATION |
|---|---|
| (GIVEN AMBIENT, DIFFUSE, & SPECULAR COLORS SPECIFIED BY USER) | (GIVEN FILL, SHADOW, & HILIGHT COLORS, AND HILIGHT_THRESHOLD SPECIFIED BY USER) |
| RESULT = AMBIENT | RESULT = FILL |
| FOR EACH LIGHT IN SCENE: | FOR EACH LIGHT IN SCENE: |
| FIRE RAY TO LIGHT TO DETERMINE LNORM & LCOLOR | FIRE RAY TO LIGHT TO DETERMINE LNORM & LCOLOR |
| RESULT += LNORM*LCOLOR*DIFFUSE (ACCUMULATES DIFFUSE ILLUMINATION COMPONENT) | IF THE LIGHT RAY IS NOT OCCLUDED BY ANY SURFACE & LNORM < HILIGHT_THRESHOLD |
| DETERMINE SPECULAR COEFFICIENT, SPEC | RESULT = (LCOLOR*HILIGHT) + ((1.0 - LCOLOR) * FILL) |
| RESULT+=SPEC*LCOLOR*SPECULAR (ACCUMULATES SPECULAR ILLUMINATION COMPONENT) | ELSE RESULT = SHADOW |

FIG. 7

TOON_INK OUTPUT SHADER

| LINES BETWEEN COLORS | 140 | 142 |
|---|---|---|
| CREATE LUMINANCE MAP OF RGBA IN FB1 | FOR EACH PIXEL (X,Y) OF RGBA & FB1, $FB1_{(X,Y)} = R_{(X,Y)} + G_{(X,Y)} + B_{(X,Y)}/3.0$ | |
| CREATE EDGE MAP OF FB1 IN FB2 | FOR EACH PIXEL (X,Y) OF FB1 & FB2, $FB1_{(X,Y)}$ = HIGH-PASS FILTER CONVOLUTION OF FB2 CENTERED AT (X,Y) | |
| CREATE BLURRED EDGE MAP OF FB2 IN FB1 TO "SPREAD" LINE | FOR EACH PIXEL (X,Y) OF FB2 & FB1, $FB1_{(X,Y)}$ = BLUR FILTER CONVOLUTION OF FB2 CENTERED AT (X,Y) | |
| ADJUST LINE QUALITY OF FB1 IMAGE USING "SMOOTHSTEP" FILTER | FOR EACH PIXEL (X,Y) OF FB1, $FB1_{(X,Y)}$ = SMOOTHSTEP ($FB1_{(X,Y)}$) | |
| COMPOSITE LINES IN FB1 OVER IMAGE IN RGBA | FOR EACH PIXEL (X,Y) OF FB1 & RGBA, $RGBA_{(X,Y)} = RGBA_{(X,Y)} * FB1_{(X,Y)}$ | |

| LINES ON SURFACE CONTOURS | 144 | 146 |
|---|---|---|
| CREATE EDGE MAP OF NORMAL IN FB1 | FOR EACH PIXEL (X,Y) OF NORMAL & FB1, $FB1_{(X,Y)}$ = HIGH-PASS FILTER CONVOLUTION OF NORMAL CENTERED AT (X,Y) | |
| "NORMALIZE" VALUES IN FB1 | FOR EACH PIXEL (X,Y) OF FB1, $FB1_{(X,Y)} = FB1_{(X,Y)}$ /(LARGEST VALUE IN FB1) | |
| ADJUST LINE QUALITY OF FB1 IMAGE USING "SMOOTHSTEP" FILTER | FOR EACH PIXEL (X,Y) OF FB1, $FB1_{(X,Y)}$ = SMOOTHSTEP ($FB1_{(X,Y)}$) | |
| COMPOSITE LINES IN FB1 OVER IMAGE IN RGBA | FOR EACH PIXEL (X,Y) OF FB1 & RGBA, $RGBA_{(X,Y)} = RGBA_{(X,Y)} * FB1_{(X,Y)}$ | |

*FIG. 8*

SIMULATING CEL ANIMATION AND SHADING

FIELD OF THE INVENTION

This invention generally pertains to a method and system for creating animations, and more specifically, to a method and system for automatically creating cel images used in an animation that have a desired characteristic appearance.

Background of the Invention

Primitive cel animation techniques using photographs of top-lit line drawings projected in sequence were developed during the early 1900s. Due to the phenomenon known as persistence of vision, an object drawn in a slightly different position in each successive image appears to be in motion when the images are projected at a sufficiently rapid rate. Subsequently, instead of using top-lit drawings, the images were drawn on clear acetate, which came to be known as "cels" because of the cellulose composition of the material. These acetate cels could be top-lit or back-lit, colored, "multi-planed," etc. Since several cels could be combined, moving elements could easily be isolated from static elements, which provided better efficiency in the very labor intensive operation required to hand draw and color each cel.

Technical innovations have greatly improved on the process of preparing animations. Computer-assisted cel animation has sped up the process of creating the frames between "keyframes," and enabled ink-and-paint steps to be automated. More recently, cel-animated films have been produced that incorporate elements created using three-dimensional (3D) tools, and effects animation, which are normally laborious to create, implemented on the computer with techniques such as particle systems and image processing. Computers have even been used for wholesale production of background animation, using 3D and two-dimensional (2D) animation techniques. Although a computer can be used as a tool to reduce the effort required to produce cel animations, the finer examples of this technology still require considerable time and artistic skill to create an acceptable product.

One of the problems arising from relying upon the 2D or 3D rendering capabilities of the computer to produce at least portions of the images comprising cels used in animations is that the typical computer rendered image fails to achieve the cartoon ("toon") look of a traditionally hand-drawn cel. Those artisans of the cel animation process will appreciate that there is a considerable difference in appearance between a typical computer image rendered with smoothly varying colors and a hand-drawn cel of the traditional type used in high quality cel animations. While many subjective characteristics may be ascribed to the traditional animated cel, there are at least two distinctive features that are signature characteristics. Specifically, a traditional cel begins with a line drawing, i.e., the ink of the ink-and-paint, which is commonly referred to as "outlining." Secondly, a traditional cel is then painted with various solid colors, corresponding to the paint of the traditional ink-and-paint technique. In contrast, a normal computer rendered image does not include outlining, and the colors used in the rendering are typically smoothly blended between the shadow areas and the highlight regions to achieve a more natural 3D look, e.g., using techniques such as Goraud or Phong shading. Animations made with rendered images thus do not appear like traditional cel animations or "toons."

Since backgrounds in cel animations are often produced using techniques and media such as water color and tempera, which are not suitable for the animation of characters, it is best to consider only the visual characteristics of cel animations that are most often found in non-background elements. Although computer-assisted animation techniques implementing digital ink-and-paint and automated inbetweening are known, it may be preferable for the 3D computer animator to use tools and skill to create a cel-animated look based on a normal 3D rendered image. The 3D tools allow the animator to rely on familiar modeling and articulation techniques such as flexible enveloping and inverse kinematics to create and animate characters. Skill in applying these tools to achieve the quality of animation achievable with traditional animated cels will undoubtedly be required, but it would clearly be desirable to create the traditional animated cel look starting with the normal rendered frame produced by the computer 3D rendering of an image. Currently, no prior art technique is known to achieve the transformation of a computer rendered image into the traditional animated cel or toon look.

SUMMARY OF THE INVENTION

In accord with the present invention, a method for automatically producing a cel image that simulates a hand-drawn animation cel comprises the step of using a computer to render a colored image. This step also produces surface normal data for surfaces in the colored image. When rendering the colored image, a predetermined threshold angle is compared with angles at which light rays intersect with surfaces in different portions of the rendered image to determine which of a plurality of predefined colors are applied to the surfaces. Color lines that delineate differently colored portions of the colored image are created by detecting edges between the differently colored portions. The color lines are extended along these edges. Contour lines that follow an outline of an object in the colored image and which define any curves on an interior surface of the object are created by detecting edges in the colored image as a function of the surface normal data. The colored image, color lines, and contour lines are composited to produce the cel image. In the cel image, the color lines and contour lines simulate outlining similar to that used in a corresponding animation cel, and the predefined colors applied to the different portions of the image simulate paint colors applied to the corresponding animation cel.

The colored image preferably comprises a plurality of display elements. Each of the plurality of display elements has a red component, a green component, and a blue component. To create the color lines, luminance values are determined for the plurality of display elements based upon the red, green, and blue components of each display element. Next, the luminance values of the colored image are convoluted using a high-pass filter kernel.

The method optionally further comprises the step of processing data defining the color lines to thicken and smooth them using a convolution filter. In addition, the method may optionally include the step of applying a "smoothstep" filter to the data defining the color lines to increase their contrast.

The step of creating contour lines preferably includes the steps of convolving the surface normal data produced by rendering the colored image to detect edges defining the outline of the object. Results obtained from the preceding step are normalized to produce data defining the contour lines. An additional convolution filter may be applied to the data defining the contour lines to further modify their characteristics.

In its preferred form, the method further comprises the step of antialiasing the colored image to produce the cel image. Antialiasing is effected by initially creating the rendered image at a substantially higher resolution than that required of the cel image, and averaging a predefined number of display elements in the colored image to obtain each display element comprising the cel image.

In one embodiment, the step of creating contour lines includes the step of determining vector dot products of the surface normal data for adjacent picture elements in the colored image. The vector dot products are then convolved to detect the contour lines in the colored image. Alternatively, the step of creating contour lines comprises the step of applying a bump map to the surfaces in the colored image.

The color lines are optionally selectively rendered to an alpha channel of the colored image to enable separate processing and subsequent compositing with the colored image. Or the contour lines can optionally be selectively rendered to the alpha channel of the colored image to enable separate processing.

A border of display elements is added around a periphery of the colored image prior to creating the color lines and the contour lines, to facilitate application of the convolution filter to pixels comprising the colored image.

Another aspect of the present invention is directed to a system for automatically producing a cel image that simulates a hand-drawn animation cel. The system includes a display, a processor, and a memory in which a plurality of machine instructions are stored. The machine instructions are executed by the processor to cause it to carry out functions that are generally consistent with the steps of the method discussed above.

Yet another aspect of the invention is an article of manufacture adapted to be used with a computer for automatically producing a cel image that simulates a hand-drawn animation cel. The article of manufacture includes a nonvolatile memory device on which are stored a plurality of machine instructions. The machine instructions, when executed by the computer, cause it to implement functions that are also generally consistent with the steps of the method discussed above.

BRIEF DESCRIPTION OF THE DRAWING FIGURES

The file of this patent contains at least one drawing executed in color. Copies of the patent with color drawings will be provided by the Patent and Trademark Office upon request and payment of the necessary fee.

The foregoing aspects and many of the attendant advantages of this invention will be more readily appreciated as the same becomes better understood by reference to the following detailed description, when taken in conjunction with the accompanying drawings, wherein:

FIG. 3 is a schematic illustration showing how an object is rendered, but is simplified to show only a single light ray being cast onto the object;

FIG. 4 is a block diagram showing how data defining the rendered image is stored;

FIG. 5 is a flow chart illustrating the logical steps implemented when rendering an image;

FIG. 6 illustrates the steps used in a typical material shader for rendering an image;

FIG. 7 is a chart that compares a typical Phong material shader (prior art) to the "Toon_Paint" material shader of the present invention;

FIG. 8 is a chart illustrating the logical steps implemented by the Toon_Ink output shader of the present invention;

Figure 10:
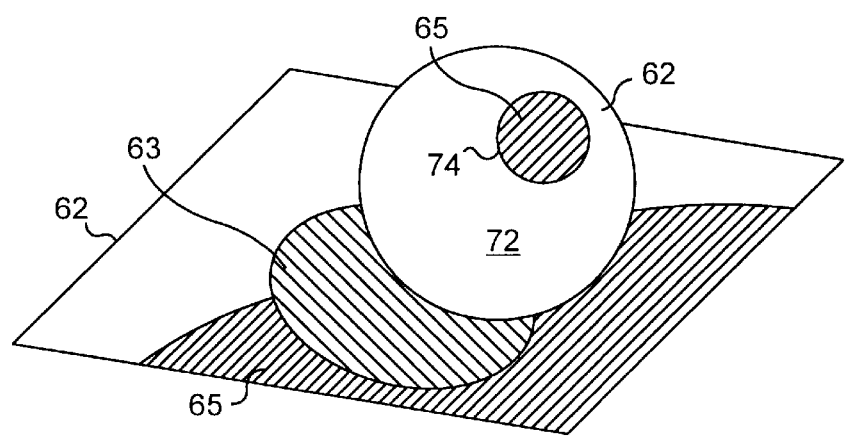
Figure 11:
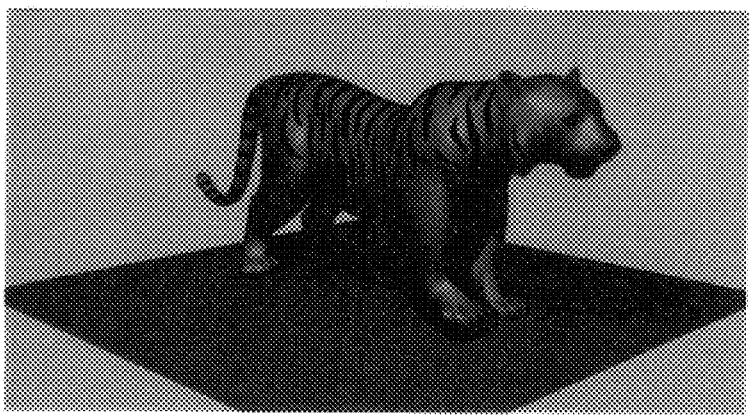
Figure 15:
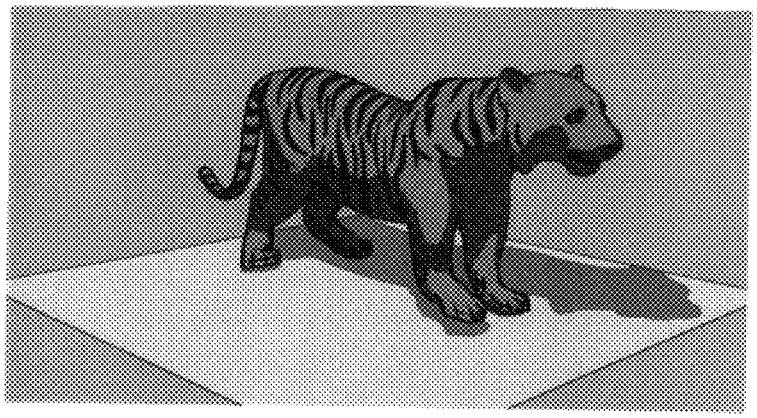
Figure 14:
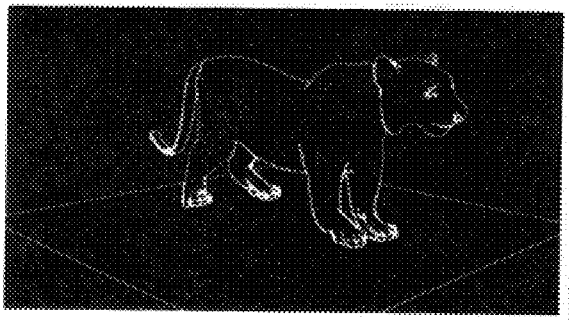
Figure 13:
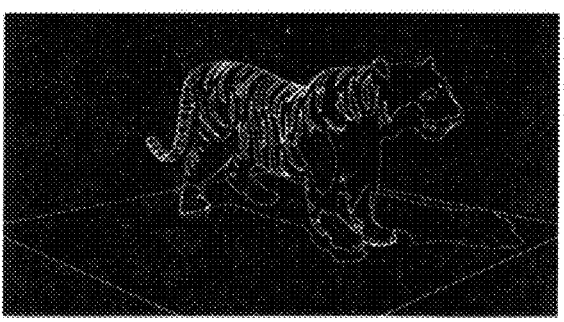
Figure 12:
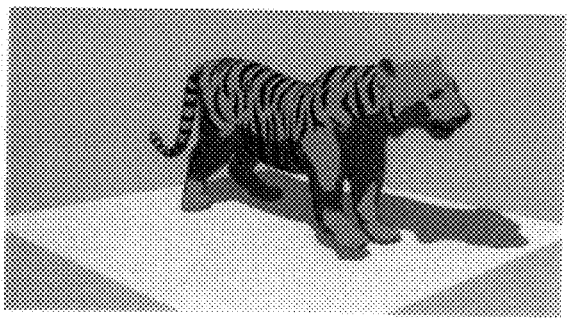

FIG. 10 graphically illustrates how the present invention applies color to different areas of an exemplary simple image;

FIG. 11 is an image rendered in full color using a prior art Phong shading technique;

FIG. 12 is a colored image produced by the Toon_Paint procedure of the present invention, showing the fill, highlight, and shadow color areas returned by the Toon_Paint renderer;

FIG. 13 illustrates the output of the Toon_Paint shader for the present invention, showing white lines that separate areas of different colors in the color image of FIG. 12;

FIG. 14 illustrates the output of the Toon_Ink shader of the present invention, showing the white lines that outline the shape of the object and curves on its interior surface; and FIG. 15 is a colored image showing the composite "toon" representation of the object produced by the present invention, which simulates a conventional hand-drawn cartoon animation cel.

DESCRIPTION OF THE PREFERRED EMBODIMENT

Computer System Suitable for Implementing the Present Invention

Figure 1:
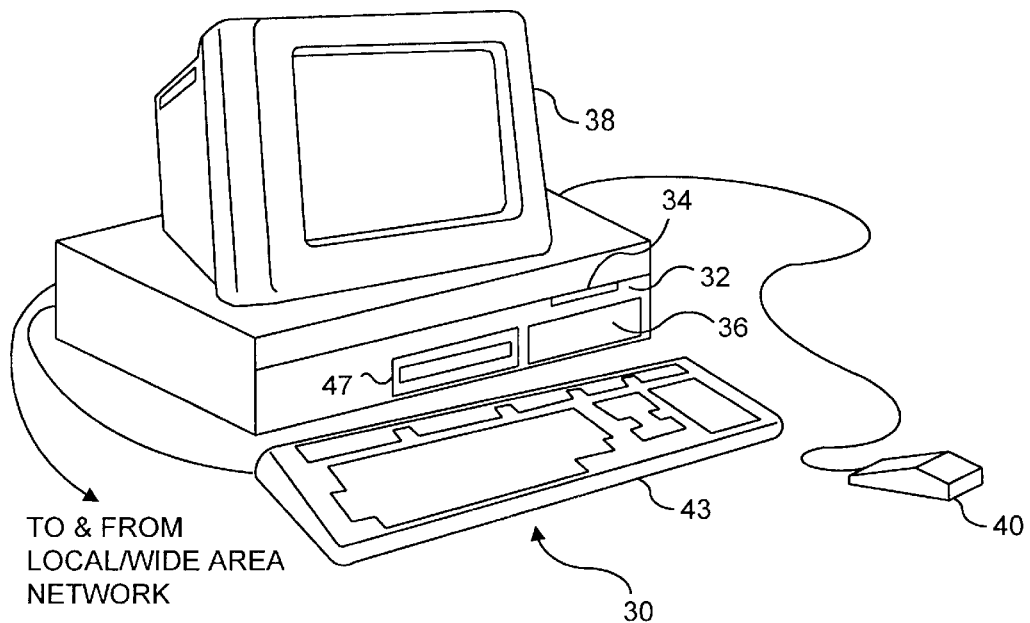
FIG. 1 is an isometric view of a computer suitable for use in implementing the present invention.

With reference to FIG. 1, a generally conventional personal computer 30 is illustrated, which is suitable for use in connection with practicing the present invention. Alternatively, a workstation may be instead be used. Personal computer 30 includes a processor chassis 32 in which are mounted a floppy disk drive 34, a hard drive 36, a motherboard populated with appropriate integrated circuits (not shown), and a power supply (also not shown), as are generally well known to those of ordinary skill in the art. A monitor 38 is included for displaying graphics and text generated by software programs that are run by the personal computer. A mouse 40 (or other pointing device) is connected to a serial port (or to a bus port) on the rear of processor chassis 32, and signals from mouse 40 are conveyed to the motherboard to control a cursor on the display and to select text, menu options, and graphic components displayed on monitor 38 by software programs executing on the personal computer. In addition, a keyboard 43 is coupled to the motherboard for user entry of text and commands that affect the running of software programs executing on the personal computer.

Personal computer 30 also optionally includes a compact disk-read only memory (CD-ROM) drive 47 into which a CD-ROM disk may be inserted so that executable files and data on the disk can be read for transfer into the memory and/or into storage on hard drive 36 of personal computer 30. For use in connection with the present invention, personal computer 30 is coupled to a local area and/or wide area network and is one of a plurality of such computers on the network.

Figure 2:
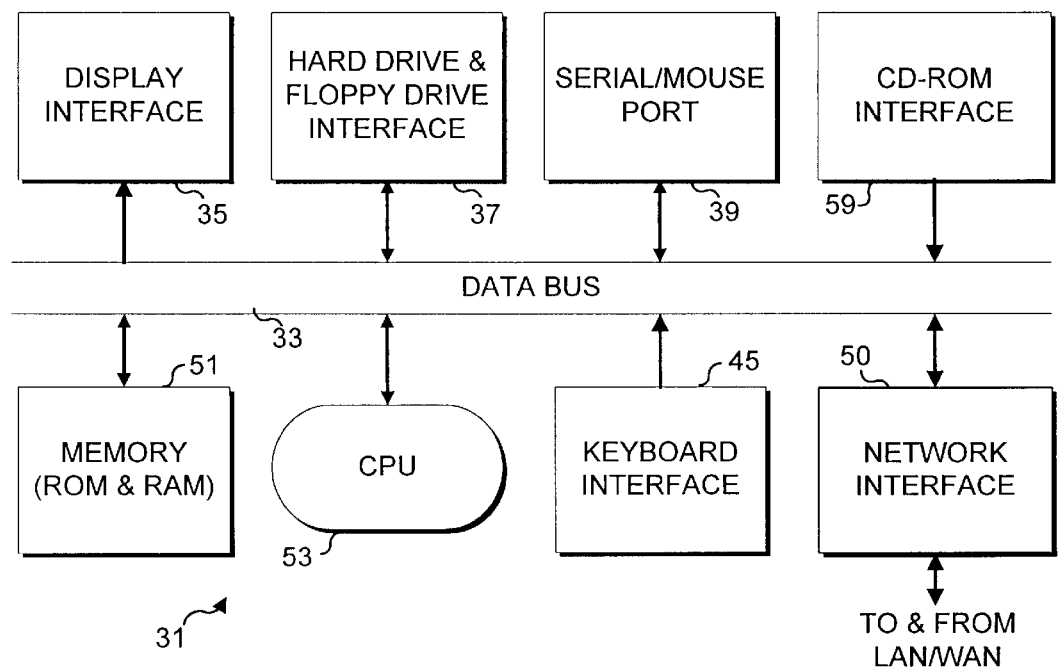
FIG. 2 is a block diagram of the functional components disposed in the processor chassis of the computer shown in FIG. 1.

Although details relating to all of the components mounted on the motherboard or otherwise installed inside processor chassis 32 are not illustrated, FIG. 2 is a block diagram illustrating some of the functional components that are included. The motherboard includes a data bus 33 to which these functional components are electrically connected. A display interface 35, comprising a video card, for example, generates signals in response to instructions executed by a central processing unit (CPU) 53 that are transmitted to monitor 38 so that graphics and text are displayed on the monitor. A hard drive and floppy drive interface 37 is coupled to data bus 33 to enable bidirectional flow of data and instructions between data bus 33 and floppy drive 34 or hard drive 36. Software programs executed by CPU 53 are typically stored on either hard drive 36, or on a floppy disk (not shown) that is inserted into floppy drive 34. The software programs comprising the present invention and associated with a computational task that will be solved by a distributed processing environment comprising the network by which the plurality of computers are linked will likely be distributed either on such a floppy disk, on-line via a modem, or on a CD-ROM disk; these programs are normally stored on hard drive 36 for execution by CPU 53.

A serial/mouse port 39 (representative of the two serial ports typically provided) is also bidirectionally coupled to data bus 33, enabling signals developed by mouse 40 to be conveyed through the data bus to CPU 53. A CD-ROM interface 59 connects CD-ROM drive 47 to data bus 33. The CD-ROM interface may be a small computer systems interface (SCSI) type interface or other interface appropriate for connection to and operation of CD-ROM drive 47.

A keyboard interface 45 receives signals from keyboard 43, coupling the signals to data bus 33 for transmission to CPU 53. Optionally coupled to data bus 33 is a network interface 50 (which may comprise an Ethenet™ card for coupling the personal computer to a local area and/or wide area network). Data used in connection with the present invention may be stored on a server and transferred to personal computer 30 over the network to carry out the task.

When a software program is executed by CPU 53, the machine instructions comprising the program that are stored on a floppy disk, a CD-ROM, or on hard drive 36 are transferred into a memory 51 via data bus 33. Machine instructions comprising the software program are executed by CPU 53, causing it to implement functions determined by the machine instructions. Memory 51 includes both a non-volatile read only memory (ROM) in which machine instructions used for booting up personal computer 30 are stored, and a random access memory (RAM) in which machine instructions and data are temporarily stored when executing application programs.

Description of the Process Used to Produce a Toon Image

In its current preferred embodiment, the present invention is implemented using a modified general purpose ray tracing program having capabilities that may readily be extended through run time linking of user-written C language "shader" functions. This ray tracing software program, entitled Mental Ray™, is distributed by SoftImage Corporation, a Canadian subsidiary of Microsoft Corporation. Using Mental Ray, an operator may process image data using various included macros and functions, as well as C/C++ run time libraries and code imported from other sources. In Mental Ray, several types of shaders may be integrated, each with a specific roll in rendering an image. Two types of shaders are used in connection with the present invention. The first type of shader is a material shader, which is typically called at every intersection of a light ray with a surface of an object in an image to evaluate the color and transparency of the surface where the light ray intersects the surface. The second type of shader used in the present invention is referred to as an "output shader" because it is invoked after all ray sampling is completed, for example, to apply image-processing functions to a completed frame before it is written to storage on a disk or displayed on a monitor.

The preferred embodiment relies upon low-level functions of the Mental Ray ray tracing program for rendering an image, such as visible surface determination, ray/surface intersection determination, and antialiasing. However, the operation of the software has been substantially modified to achieve the "toon look" for images produced using the program. Other aspects of the Mental Ray software program can optionally be employed to modify the toon image, such as motion blur, depth of field, area lighting, etc., or to produce a novel hybrid imagery incorporating attributes of both conventional cel and 3D animation. Further, it will be apparent that the techniques employed in connection with the present invention can also be implemented using other commercially available, user-extensible 3D rendering programs and/or rendering libraries of functions.

The process employed by the present invention to create a toon cel image is divided into two discrete parts. In the first part, a Toon_Paint material shader is applied to the data produced by fully rendering an image in a conventional manner, to determine the color of various parts of a colored image that will be used for the toon rendering. In the second part of the process, outlining of different portions of the image are implemented using a Toon_Ink output shader. Application of these two processes can be done independently, or in combination with each other, and/or with other rendering functions, as noted above. In the preferred embodiment, the final rendering is a one-pass process that produces a finished frame in which the image possesses the desired signature qualities of a cel animation image like that typically produced using a more conventional cel animation technique, e.g., by producing a hand-drawn cel or toon frame.

In the conventional rendering process implemented by the Mental Ray ray tracing program, a material shader accomplishes the task of coloring 3D objects in each frame. The conventional material shader takes into account the basic coloration, texture, illumination, shadows, reflections, and transparency of each object in the frame, at each point on the surface of the object. The term "material shader" is used in connection with this process since the resulting fully rendered, smoothly shaded depiction of an object is a function of certain parameters expressing the ambient, diffuse, and specular color components or transparency of the material comprising the object. It is possible to optionally associate textures with the surface of an object so that when evaluated during the full rendering process, the textures modify color values of a light ray/surface intersection point.

FIG. 3 provides a simplified illustration showing how a ray tracing program such as Mental Ray fully renders an object in a scene. As shown in this simplified illustration, a primary light ray 76 is cast toward an object 72 for one pixel of a frame 70. In the rendering process, rays are cast from each pixel toward the object, but only one is shown in this simplified view. The primary rays are cast into the scene in a direction determined by the ray tracing program or by a "lens shader" interposed between the light source and the object being rendered. Upon intersection of a primary light ray with the surface of an object 72, the ray tracing program calls the material shader that is assigned to the surface. For each ray/surface intersection point, the material shader evaluates the texture of the surface, modifying the color of the material as appropriate.

The material shader determines the effect of scene lighting on the color of the material at each point by adding the contribution of the various light sources illuminating the object. Thus, if additional light sources illuminate the object, additional rays are cast to the ray/surface intersection point from the light sources so that the material color is determined by summing the contribution of each light source. If the surface of the object is reflective, it casts rays or reflections that may be combined with the previously established material color determined for the primary light ray at each point. The combination may produce a highlight 74 as shown on object 72. If the surface is transparent, the material shader casts rays affected by the transparency or refraction of the object and combines the resulting rays at each point with the material color and alpha value previously determined for that point from the intersection of other light rays. The alpha value for each point is a parameter between zero and one that specifies the transparency of a surface at that point. An alpha value of zero specifies an absolutely transparent surface, and an alpha value of one specifies a surface that is totally opaque. The material shader returns a resultant color defined by red, green, and blue (RGB) components and the alpha value for each point on the surface of the object being rendered. The RGB and alpha values are then assigned to the pixels (image elements) for the image frame being rendered.

The present invention uses the framework for the conventional material shader, modifying the portion of the rendering process implemented by the material shader that is responsible for smooth shading and evaluating illumination to achieve the requirements for the toon look in the final image. This modified material shader is referred to as the Toon_Paint material shader, and it is compatible with existing procedures for texture mapping, lighting, shadowing, and other aspects of the rendering process.

A conventional rendering produces an image in which there is typically a smooth color transition in the shading applied to the surface of objects, thereby producing a scene in which objects appear naturally illuminated and as lifelike as possible. In contrast, the present invention can be thought of as applying overlapping opaque layers of solid colors to illustrate an object in a scene. The color of a surface produced by the present invention depends upon the angle of the surface to the light striking it. Thus, a point on the surface of an object is by default "painted" a basic fill color, receiving a highlight color only if it faces a light source. Areas of the scene which are in shadow because light from a source is precluded from illuminating the surface, for example, due to occlusion by another surface, are painted a "shadow color." The fill, shadow, and highlight colors that are employed in the present invention can be considered analogous to the ambient, diffuse, and specular colors typically specified for a conventional material shader used to render a scene, but the result of rendering a scene using a conventional material shader is very different from that obtained by the rendering using the Toon_Paint material shader.

In the present invention, a user-determined parameter specifies the threshold for the angle between the surface and a light ray intersecting the surface that determines whether the fill or highlight color is applied. If the angle of the light ray striking a surface is less than the threshold, the highlight color is applied to that point on the surface. This threshold thus controls the relative size and shape of any highlights on a surface in the image.

In the actual implementation of the present invention, the pixels comprising an image are maintained in a frame buffer 64. For each pixel of the frame buffer, one or more primary rays is cast into the scene, as described above in connection with FIG. 3. The Toon_Paint shader is called for each intersection of a primary ray with the surface to determine the color (RGB components and alpha value) associated with the pixel for storage in the frame buffer. After all pixel values are determined, an output shader is invoked as indicated in a block 66, to write the finished rendering into files as indicated in a block 68.

In the present invention, alternative methods can be specified for coloring a transition region between the fill and highlight colors, to meet the requirements for certain styles used in cel animation. A transition region between fill and highlight colors is often also employed in the traditional ink-and-paint hand-drawn techniques. Although the transition between a highlight color and fill color is solely determined by the threshold angle in the present invention, the user may optionally specify a linear interpolation between the two colors used for highlight and fill to create a colored gradient that is applied to the region (not shown in the drawings) between areas of highlight and fill color. Alternatively, an average of the highlight and fill colors can be used for coloring this region, creating a distinct third color between the two. Furthermore, the user may specify a width of the boundary region between highlight and fill colors.

FIG. 5 shows the logical steps implemented by the Toon_Paint material shader of the present invention. From a start block 80, the logic proceeds to a block 82, in which for each pixel of the frame buffer, primary rays are cast into the scene. A decision block 84 determines whether each primary ray intersects a surface of the object. If so, a block 86 provides for calling and applying the modified Toon_Paint material shader that is assigned to the surface of the object. Thereafter, or if the ray does not intersect the object's surface, a decision block 88 determines if any more pixels (or light rays) need to be processed. If so, the logic proceeds to a block 90 to process the next ray, continuing at decision block 84. Otherwise, a block 92 invokes the output shader. The resulting color and alpha data for the pixels comprising the frame are written to one or more files, as indicated in a block 94. This portion of the toon rendering process terminates, as indicated in a block 96.

Details of the steps implemented by a material shader are illustrated in FIG. 6. A conventional Phong material shader is compared to the Toon_Paint material shader of the present invention in FIG. 7, in regard to the evaluation of illumination. As noted in a block 110 in FIG. 6, after a conventional material shader is invoked, the shader evaluates a number of parameters for each ray/surface intersection, as indicated in a block 112. The parameters that are evaluated in blocks 114, 116, 118, and 120 respectively include texture, illumination, reflection, and transmission. A block 122 accumulates the results of the evaluation and returns a modified ray color and alpha value for the pixel to the Mental Ray program.

The primary differences between a conventional Phong material shader and the Toon_Paint material shader in evaluating illumination, are indicated in columns 130 and 132, respectively. For the Phong material shader of the prior art, the user specifies ambient, diffuse, and specular colors. In contrast, as indicated in column 132, the Toon_Paint material shader is provided with fill, shadow, and highlight colors, and with a HILIGHT_THRESHOLD, which are also specified by the user. The Phong material shader returns a result that initially defaults to the ambient color, while the Toon_Paint material shader returns a result that initially defaults to the fill color.

Further, as indicated in column 130, for each light ray cast into the scene, the Phong material shader determines values for LNORM and LCOLOR. LNORM is equal to the product of the surface normal and the light ray hitting the surface at a point where the light ray intersects with the surface. LCOLOR is equal to the color of the light ray reaching the point. Similarly, the Toon_Paint material shader also casts a light ray to the surface and determine values for LNORM and LCOLOR where the light ray intersects the surface. For the Phong material shader, a RESULT is determined by accumulating the diffuse elimination component defined by the product of LNORM, LCOLOR, and a value for DIFFUSE. (The value for DIFFUSE indicates the color a surface that is neither in shadow nor in highlight.) However, the Toon_Paint material shader determines that if the light ray is not occluded by any surface and if LNORM is less than the HILIGHT_THRESHOLD angle specified by the user, the RESULT is set equal to (LCOLOR*HILIGHT) plus ((1.0-LCOLOR)*FILL). The Phong material shader also determines the specular coefficient, SPEC, and finally, accumulates a new RESULT value for a specular illumination component, which is the sum of the successive products SPEC*LCOLOR*SPECULAR. In this expression, the value of SPECULAR indicates the color of a surface where a highlight exists. In column 132, if LNORM is not less than the HILIGHT_THRESHOLD, a new value for RESULT is set equal to the shadow color. Accordingly, the Toon_Paint material shader only returns color values for each pixel equal to either the fill, highlight, or shadow colors. In contrast, the Phong material shader returns a color for each pixel selected from a potentially wide range of colors determined by mixing the ambient, diffuse, and specular colors, without any consideration of a HILIGHT_THRESHOLD parameter.

Having determined the color for each pixel in the scene using the Toon_Paint material shader, a Toon_Ink output shader is then applied to define the lines between each of the areas colored with fill, highlight, and shadow colors. FIG. 8 includes a first column on the upper left that explains how lines are determined between each of the colors and a column on the upper right that discloses further details for each of these steps.

The task of creating outlines for the rendering that emulates a cel look is separated into two distinct parts. In the first part, color lines are determined that trace the transition between adjacent differently colored regions, in a manner analogous to the border lines that are drawn on a map. The second part of the process determines contour lines that follow the outline or shape of an object as well as defining curves on its interior surface. Color lines are drawn to separate one material from another, as would be commonly used to serve as a guide for an ink-and-paint artist hand-coloring the scene. In contrast, contour lines delineate 3D details that are not otherwise marked by changes in colors; for example, wrinkles, folds, bumps, and curves on a surface interior are delineated using contour lines. Different styles of cell animation typically use these two types of lines in varying proportions, although use of thicker contour lines compared to the color lines seems to be a common characteristic of some cell animation styles.

To define the two different types of lines, two distinct applications of convolution filters are used to isolate edges and to provide smoothing. In the preferred embodiment of the present invention, a small C-language image processing library was developed for use in writing Mental Ray output shaders to carry out the task of creating lines for color and contour. This library includes functions such as convolution filters and implements compositing operations for various types of data. One such function, referred to as the "ARI_filter_n_to_F0," and another function, referred to as the "ARI_filter_f_to_F0" were defined as members of a set of functions that accept as arguments input that includes pointers to the Mental Ray output state structure. The output structure includes parameters for image resolution, frame time, and data type. Also included in the output structure are pointers to a Mental Ray frame buffer of the type RGBA, depth, surface normal, or label; horizontal and vertical radii of the rectangular filter kernel that is used in the convolution of the frame buffer; and a filter kernel that is stored as a linear array of integral elements for use as weighting factors in the convolution. The two functions noted above return a pointer to a floating-point buffer where results of the convolution are stored.

The procedure used in the present invention for creating the lines between color regions is initiated with the creation of a luminance map of RGBA in a frame buffer 1 (FB1). Luminance is not a function of the alpha value; as indicated in a column 142, the value for luminance that is stored in FB1 for a pixel at a location x,y, is an average of the R, G, and B values. The luminance is thus determined by summing the RGB components for the pixel and dividing the sum by three. This step is repeated for all of the pixels in the frame.

Next, as indicated in a column 140, an edge map is created from the data stored FB1 in a frame buffer 2 (FB2). The edge map contains single-pixel lines between differently colored regions. In connection with this step, for a pixel at a location x,y, the luminance value stored at FB1 is subjected to a high-pass filter convolution to determine the edge map data stored in FB2. This step determines the edge map for the pixel centered at location x,y using the luminance data for that pixel and for surrounding pixels. The high-pass filter is an "edge-detection" kernel, which in the preferred embodiment, comprises the array:

| 13 | 36   | 13 |
|----|------|----|
| 36 | -196 | 36 |
| 13 | 36   | 13 |

In this step, each number or element in the convolution filter or array is multiplied by the corresponding luminance value for the nine pixels centered around the current x and y pixel position. This process is repeated, centered about the next pixel in the row, for all of the rows in the frame. At the pixel at which the filter is centered, the values in the convolution filter are multiplied by corresponding pixel values, pixel-by-pixel across the bit map image.

Using the luminance values for each pixel for this edge-detection kernel substantially reduces the execution time that would be required if separate RGB values were instead used for each pixel. Because luminance values are used, neighboring regions with equal luminance will not produce the desired color lines. However, since creating a luminance map only requires three floating-point additions and one floating-point multiplication per pixel, compared to at least nine floating-point multiplications and nine floating-pointing additions per pixel for each channel convolution if applied to the separate RGB values, the compromise appears to be reasonable. This problem is easily compensated by carefully selecting colors for the fill, highlight, and shadow that at least have slightly different luminance values. Once the edge map is produced, its values are clamped in the range 0.0 to 1.0, since the filtering technique does not necessarily produce unit values. To clamp the results, any values that are outside the range are simply clipped.

Next, as indicated in column 140, the edge map in FB2 is blurred to spread the color lines and the result is stored in FB1. In this step, for each pixel at location x and y, the value stored in FB1 for frame position x and y is determined by applying a blur filter convolution for the values stored at that pixel in FB2. This second convolution thickens and smoothes the color lines. For this smoothing pass, the following low-pass filter kernels are used: For thin lines, the following filter is applied:

| 13 | 36  | 13 |
|----|-----|----|
| 36 | 100 | 36 |
| 13 | 36  | 13 |

For slightly thicker lines, the following low-pass kernel is used:

| 0 | 0  | 1   | 0  | 0 |
|---|----|-----|----|---|
| 0 | 13 | 36  | 13 | 0 |
| 1 | 36 | 100 | 36 | 1 |
| 0 | 13 | 36  | 13 | 0 |
| 0 | 0  | 1   | 0  | 0 |

For still thicker lines, the following filter kernel may be used:

| 0 | 0  | 0  | 1   | 0  | 0  | 0 |
|---|----|----|-----|----|----|---|
| 0 | 1  | 8  | 13  | 8  | 1  | 0 |
| 0 | 8  | 36 | 60  | 36 | 8  | 0 |
| 1 | 13 | 60 | 100 | 60 | 13 | 1 |
| 0 | 8  | 36 | 60  | 36 | 8  | 0 |
| 0 | 1  | 8  | 13  | 8  | 1  | 0 |
| 0 | 0  | 0  | 1   | 0  | 0  | 0 |

Still thicker lines are produced in a similar fashion.

The next step provides for adjusting the quality of the color lines stored in FB1 using a "smoothstep" filter to insure that the color lines have high contrast but include soft edges. The convolution kernel applied in this step is not shown, since it is generally well known in the art.

Figure 9:
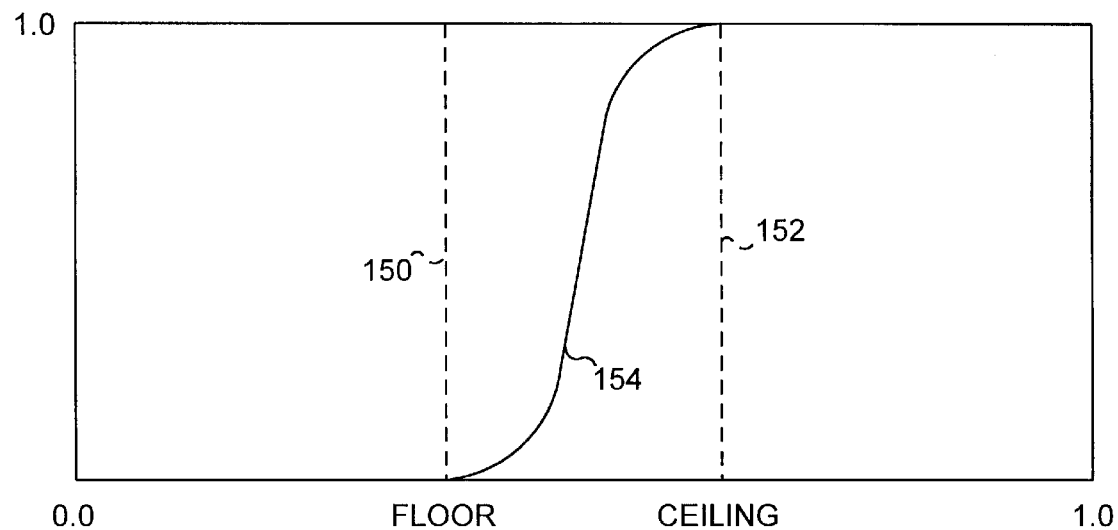
FIG. 9 is a graph of a function implemented by a smoothstep filter.

An example of a smoothstep filter of the type applied to the color line data is illustrated in FIG. 9. In this Figure, floating-point values are assigned to a "floor" 150 and a "ceiling" 152. The filter processes floating-point values for the color line data that are input to determine a floating-point output value based on a function depicted by a curve 154. This function creates a smooth transition between 0.0 and 1.0 for input values that are between the floor and ceiling thresholds. The input values are depicted on the horizontal axis of the graph in FIG. 9, and the output values are shown on its vertical axis. The effect of smoothstep filter is easily understood by reference to the following pseudocode that describes its implementation given:

```
floating point values in, out, floor, ceil, and norm
if(in < floor) out = 0.0
else if(in > ceil) out = 1.0
```

-continued

```
else {
    norm = (in - floor)/(ceil - floor)
    out = (norm * norm) * (3 - (2 * norm))
}
```

Finally, the color lines that have been smoothed by the previous step and stored as data in FB1 are composited with the colored image defined by the RGBA values. As indicated in column 142, for each pixel at location x,y, a new RGBA value is determined that is equal to the product of the RGBA value and the value stored in FB1 for the pixel at location x,y. The resulting image typically includes soft-edged black lines disposed between the differently colored regions determined previously using the Toon_Paint material shader.

Columns 144 and 146 in FIG. 8 respectively define the general steps and related details for determining the lines that define surface contours for the toon look image that is being produced. As noted above, contour lines follow the outlines of an object as well as defining curves on its interior surfaces. The contour lines are determined in a manner similar to the technique used to determine the lines between colors, i.e., edge detection followed by smoothing of the lines. However, to determine the contour lines, the edge detection filter is applied to data stored in a surface-normal frame buffer that is automatically generated by the Mental Ray program when the colored image is initially rendered using the Toon_Paint material shader. This buffer contains the surface-normal vectors that are returned by the primary-ray trace function that was previously executed for the pixel in the frame. These vectors are stored in the buffer as floating-point triples. The surface-normal vector frame buffer therefore is a record of the shapes of the objects seen by an imaginary camera viewing the scene. Vector differences between neighboring pixels in this frame buffer may be thought of as expressing the degree of curvature of the objects' surface(s).

Instead of convolving the luminance values as was done to determine the color lines, surface contour lines are obtained by convolving the vector product of the surface-normal values at the center of a convolution's support and its neighboring pixels. The resulting vector product is a convenient way of expressing the angle between two such vectors. The edge map of the normal that is stored in FB1 is created as indicated in column 146 for each pixel at a location x,y in FB1 and in the surface-normal frame buffer (indicated by the term "NORMAL"). A new value is stored in FB1 for each pixel at location x,y, determined by applying a high-pass filter convolution to the surface-normal centered at that location. This steps is repeated for all pixels in FB1.

Next, the edge map data stored in FB1 is normalized. In this step, for each pixel at location x,y in the data stored in FB1, a new value is determined by dividing the previous value by the largest value that was stored in FB1. This step is undertaken to partially insure an invariance of the effect when the same scene is rendered at different resolutions, since a surface's curvature will be seen to change more rapidly at each sample when fewer samples are taken.

The next step indicated in column 144 of FIG. 8 is optional. This step provides for adjusting the contour line quality in the data stored in FB1 using a smoothstep filter. It is also possible to apply thresholding and gain adjustments to this data in order to cull unwanted contours from the surface-contour edge map, or modify line characteristics, or remap the gradients produced by the edge detection step from high to low curvature. Accordingly, the user has the ability to generate not only basic contour lines but also more esoteric effects that can be used to simulate media other than pen-and-ink on acetate.

After optionally thickening the lines with a blurring filter and increasing their contrast with the smoothstep filter, the data in FB1 are composited by combining the data with the composited data stored in the RGBA frame buffer, which were defined by the last step in column 142. As indicated in the last block of column 146, for each pixel at location x,y in both the FB1 and RGBA buffers, a new value RGBA is determined from the product of the data at that location in the RGBA and FB1 buffers.

Contour lines are thus created where any geometric discontinuities in the image are emphasized by the high-pass edge detection filter. In addition, contour lines can also be placed using methods that do not involve explicitly modeling such geometry. For example, an operator can alter the threshold beyond which surface normals are not smoothly interpolated across adjacent polygons representing the surface. This technique enables the operator to control whether a surface will appear smooth with rounded edges or relatively rough with sharp edges, which is more like the surface produced by rendering using standard smooth shaving.

A second optional technique provides for applying bump maps to the surface of an object using standard texture-mapping tools. A bump map is used for simulating variations in surface geometry without actually altering the geometry. The variations are simulated by perturbing surface normal data for the surface. Thus, very complex surfaces (wrinkles, folds, bumps) can be simulated without increasing the complexity of the surface itself. The bump map technique is described by J. F. Blinn in "Simulation of Wrinkled Surfaces" *SIGGRAPH* 78 *Proceedings,* pages 286–292, ACM Press, 1978, the disclosure of which is hereby specifically incorporated herein by reference. However, since bump mapping perturbs affected surface normals, it produces discontinuities in the data stored in the surface-normal buffer that also appear in the contour lines. Use of bump maps to create surface-contour lines is a particularly flexible method, since it is independent of modeling techniques, may be animated, and may be used to produce effects that are often difficult to model, such as wrinkles, ripples, waves, and the like.

Another option provided the operator when producing both the color lines and the contour lines is to render only to the alpha channel of the frame buffer, thereby enabling the separate image processing and recombination of these lines with the color image.

In FIG. 10, a simple example illustrates the application of the Toon_Paint and Toon_Ink shaders to render a scene. In this simple image, object 72 (a ball) floats above an underlying planar surface. Based on the angle of lights rays intersecting the surface of ball 72 during the rendering process, the surface includes a circular highlight 74 that is colored with a highlight color 65. The principal color on ball 72 is a fill color 62, and this fill color is also applied to the surface under the ball except in two areas. One of these areas is also colored with highlight color 65. Behind the ball on the underlying surface is the second area, which is colored with a shadow color 63. The edge of the ball in this image is defined by a contour line, and each of the areas of different color in the image are separated by color lines determined as disclosed above.

Antialiasing of the Toon_Paint shader is implicit, since the shader contains no antialiasing features. Instead, the procedure relies upon the user selectable option for oversampling of primary rays provided by Mental Ray to achieve antialiasing. Although it may be possible to insure smooth transitions between differently shaded regions using a smoothstep function, like that described above, this step is unnecessary since the Mental Ray program provides fine control of adaptive oversampling and filtering of sub-samples.

Since the surface normal output buffer produced by Mental Ray is used in determining the surface-contour lines, antialiasing becomes necessary, independent of any antialiasing technique chosen for the previous primary-ray rendering done by the Toon_Paint material shader. The surface-normal output buffer is not antialiased in Mental Ray, as are its color and alpha channels. Accordingly, an optimal solution to this problem is to render the image at a resolution greater than that required in the final toon image and then scale the image to its final resolution, filtering the image data in the process. The Toon_Ink output shader used in the present invention provides options for bilinearly interpolating down to integral multiples of the original resolution, which is equivalent to oversampling, so that it is possible to render an image without using any of the options for antialiasing provided in the Mental Ray program. Thus, as an alternative to oversampling during the Toon_Paint rendering, the oversampling can be accomplished with the Toon_Ink output shader.

To appreciate the differences between conventional rendering and the toon look rendering provided by the present invention, it is helpful to visually compare the same scene rendered in both ways. An actual colored image of a tiger produced using a prior art Phong shaded rendering is shown in FIG. 11. The same image is rendered as a toon image or cel in FIG. 15. In the prior art rendered image, it will be apparent that color lines and contour lines are not included and that the color hue applied to the tiger varies smoothly over the contours of its body. In contrast, in FIG. 15, the colors are limited to the fill, highlight, and shadow colors (and black), and both color lines and contour lines appear in the image.

FIG. 12 shows the initial rendering of the image achieved by applying the Toon_Paint shader to the image data, yielding the colored image that is used to determine the color lines. In FIG. 13, the color lines determined from the RGB data for the colored image shown in FIG. 12 are illustrated. (Note that in this image, the color lines are shown as white against a black background, but normally would be black lines against a white background.) In FIG. 14, the surface contour lines of the image determined from the surface normal data produced during the rendering process are illustrated. These lines (also white against a black background instead of the more typical black against a white background) define the shape of the tiger's body and delineate other aspects of it body, such as folds in its skin underneath its legs and along its neck.

Comparison of the images in FIGS. 11 and 15 clearly illustrates a substantial difference between the prior art smoothly shaded rendering and the toon image rendering of the present invention that simulates a hand-drawn animation cel. Accordingly, it will be apparent that the present invention can readily be applied to each frame of an animation to simulate a complete hand-drawn cartoon. By applying any of the other optional processing of the image data described above, further variations in the resulting image can readily be achieved.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for automatically producing a cel image that simulates a hand-drawn animation cel, comprising the steps of:

(a) using a computer, rendering a colored image, said step also producing surface normal data for surfaces in the colored image;

(b) when rendering the colored image, comparing a predetermined threshold angle with angles at which light rays intersect with surfaces in different portions of the rendered image to determine which of a plurality of predefined colors are applied to the surfaces;

(c) creating color lines in the colored image that delineate differently colored portions of the colored image by detecting edges between the differently colored portions along which the color lines are extended;

(d) creating contour lines that follow an outline of an object in the colored image and which define any curves on any interior surfaces of the object by detecting edges in the colored image as a function of the surface normal data; and (e) compositing the colored image, the color lines, and the contour lines to produce the cel image, said color lines and contour lines simulating outlining in the cel image of a corresponding animation cel and said predefined colors applied to the different portions of the colored image simulating paint colors applied to the corresponding animation cel.

2. The method of claim 1, wherein the colored image comprises a plurality of display elements, each of said plurality of display elements having a red component, a green component, and a blue component, and wherein the step of creating the color lines comprises the steps of:

(a) determining luminance values for the plurality of display elements based upon the red, green, and blue components of each display element; and (b) convoluting the luminance values of the colored image using a high-pass filter kernel to produce the color lines.

3. The method of claim 1, further comprising the step of processing data defining the color lines to thicken and smooth the color lines using a convolution filter.

4. The method of claim 1, further comprising the step of applying a smoothstep filter to data defining the color lines to increase their contrast.

5. The method of claim 1, wherein the step of creating contour lines comprises the steps of:

(a) convolving the surface normal data produced by rendering the colored image to detect edges defining the outline of the object; and (b) normalizing results obtained by convolving the surface normal data, to produce data defining the contour lines.

6. The method of claim 5, further comprising the step of applying an additional convolution filter to the data defining the contour lines to modify characteristics of the contour lines.

7. The method of claim 1, further comprising the step of antialiasing the colored image when it is rendered.

8. The method of claim 7, wherein the step of antialiasing comprises the steps of:

(a) initially rendering the colored image at a substantially higher resolution than that required of the cel image; and (b) averaging a predefined number of display elements in the colored image to obtain each display element comprising the cel image.

9. The method of claim 1, wherein the step of creating contour lines comprises the steps of:

(a) determining vector dot products of the surface normal data for adjacent picture elements in the colored image; and (b) convolving the vector dot products to detect the contour lines in the colored image.

10. The method of claim 1, wherein the step of creating contour lines comprises the step of applying a bump map to the surfaces in the colored image.

11. The method of claim 1, wherein the color lines are selectively rendered to an alpha channel of the color image to enable separate processing and subsequent compositing with the colored image.

12. The method of claim 1, wherein the contour lines are selectively rendered to an alpha channel of the color image to enable separate processing and subsequent compositing with the colored image.

13. The method of claim 1, further comprising the step of adding a border of display elements around a periphery of the colored image prior to creating the color lines and the contour lines.

14. A system for automatically producing a cel image that simulates a hand-drawn animation cel, comprising:

(a) an electronic display;

(b) a memory for storing a machine instruction comprising a software program and data required by and produced by the software program; and (c) a processor coupled to the memory that is controlled by the machine instructions to implement a plurality of functions when executing the software program, said functions including:

(i) rendering a colored image, and while doing so, producing surface normal data for surfaces in the colored image;

(ii) when rendering the colored image, comparing a predetermined threshold angle with angles at which light rays intersect with the surfaces in different portions of the rendered image to determine which of a plurality of predefined colors are applied to the surfaces;

(iii) creating color lines in the colored image that delineate differently colored portions of the colored image by detecting edges between the differently colored portions along which the color lines are extended;

(iv) creating contour lines that follow an outline of an object in the colored image and which define any curves on any interior surfaces of the object by detecting edges in the colored image as a function of the surface normal data; and (v) compositing the colored image, the color lines, and the contour lines to produce the cel image, said color lines and contour lines simulating outlining in the cel image of a corresponding animation cel and said predefined colors applied to the different portions of the colored image simulating paint colors applied to the corresponding animation cel.

15. The system of claim 14, wherein the machine instructions cause the processor to display the cel image on the display.

16. The system of claim 14, wherein the colored image comprises a plurality of display elements, each of said plurality of display elements having a red component, a green component, and a blue component, and wherein the machine instructions further cause the processor to:

(a) determine a luminance value for each of the plurality of display elements based upon the red, green, and blue components of the display element; and (b) convolute the luminance values using a high-pass filter kernel to produce the color lines.

17. The system of claim 16, wherein the machine instructions further cause the processor to smooth and thicken the color lines using a convolution filter.

18. The system of claim 16, wherein the machine instructions further cause the processor to apply a smoothstep filter to the color lines to increase their contrast.

19. The system of claim 16, wherein the processor creates the contour lines by:

(a) convolving the surface normal data produced by rendering the colored image to detect edges defining the outline of the object; and (b) normalizing results obtained by convolving the surface normal data, to produce data defining the contour lines.

20. The system of claim 19, wherein the machine instructions further cause the processor to apply an additional convolution filter to the data defining the contour lines to modify characteristics of the contour lines.

21. The system of claim 14, wherein the machine instructions further cause the processor to antialias the colored image to produce the cel image.

22. An article of manufacture adapted for use with a computer, for automatically producing a cel image that simulates a hand-drawn animation cel, comprising:

(a) a nonvolatile memory device; and (b) a plurality of machine instructions stored on the nonvolatile memory device, which when executed on the computer, effect a plurality of functions, including:
rendering a colored image, and while doing so, producing surface normal data for surfaces in the colored image;

(ii) when rendering the colored image, comparing a predetermined threshold angle with angles at which light rays intersect with the surfaces in different portions of the rendered image to determine which of a plurality of predefined colors are applied to the surfaces;

(iii) creating color lines in the colored image that delineate differently colored portions of the colored image by detecting edges between the differently colored portions along which the color lines are extended;

(iv) creating contour lines that follow an outline of an object in the colored image and which define any curves on any interior surfaces of the object by detecting edges in the colored image as a function of the surface normal data; and (v) compositing the colored image, the color lines, and the contour lines to produce the cel image, said color lines and contour lines simulating outlining in the cel image of a corresponding animation cel and said predefined colors applied to the different portions of the colored image simulating paint colors applied to the corresponding animation cel.

23. The article of manufacture of claim 22, wherein the colored image comprises a plurality of display elements, each of said plurality of display elements having a red component, a green component, and a blue component, and wherein the machine instructions, when executed by a computer, cause the color lines to be created by:

(a) determining luminance values for each of the plurality of display elements based upon the red, green, and blue components of the display elements; and (b) convoluting the luminance values of the colored image using a high-pass filter kernel to produce the color lines.

24. The article of manufacture of claim 22, wherein the machine instructions cause the computer to create contour lines by:

(a) convolving the surface normal data produced by rendering the colored image to detect edges defining the outline of the object; and (b) normalizing results obtained by convolving the surface normal data, to produce data defining the contour lines.

25. The article of manufacture of claim 22, wherein the machine instructions cause the computer to antialias the colored image to produce the cel image.

26. The article of manufacture of claim 25, wherein the machine instructions cause the computer to antialias by:

(a) initially rendering the colored image at a substantially higher resolution than that required of the cel image; and (b) averaging a predefined number of display elements in the colored image to obtain each display element comprising the cel image.

27. The article of manufacture of claim 22, wherein the machine instructions cause the computer to create contour lines by applying a bump map to the surfaces in the colored image.

28. The article of manufacture of claim 22, wherein the machine instructions cause the color lines to be selectively rendered to an alpha channel of the colored image to enable separate processing and subsequent compositing with the colored image.

29. The article of manufacture of claim 22, wherein the machine instructions cause the computer to add a border of display elements around a periphery of the colored image prior to creating the color lines and the contour lines.

30. The article of manufacture of claim 22, wherein the machine instructions further cause the computer to create the contour lines by:

(a) determining vector dot products of the surface normal data for adjacent picture elements in the colored image; and (b) convolving the vector dot products to detect the contour lines in the colored image.

* * * * *